3,421,919
NITROCELLULOSE LATICES COMPRISING BOTH OVERPLASTICIZED AND UNDERPLASTICIZED NITROCELLULOSE PARTICLES
Kuang Farn Lin, Monroe Park, Del., assignor to Hercules Incorporated, a corporation of Delaware
No Drawing. Filed Apr. 18, 1966, Ser. No. 543,074
U.S. Cl. 106—170                                   15 Claims
Int. Cl. C08b *21/10;* C08b *29/18*

ABSTRACT OF THE DISCLOSURE

Mixed particle nitrocellulose-water latices comprise at least one phase of hard nitrocellulose particles having a nitrocellulose to plasticizer ratio between about 90/10 and 70/30 and at least one phase of soft particles having a nitrocellulose to plasticizer ratio between about 1/99 and 55/45. The hard and soft particles are blended in a hard-soft ratio of about 1/1 to 9/1 in order to yield an overall nitrocellulose to plasticizer ratio between 80/20 and 40/60. Upon drying of the latex, the hard and soft particles come into contact and plasticizer migrates from the soft particles, causing coalescence of the nitrocellulose into a continuous film, properly plasticized so as to be hard and non-tacky.

---

This invention relates to new and improved latex coating compositions and to a process for preparing the same. In particular, it relates to coalescible latex coating compositions prepared from synthetic film forming materials generally regarded as too hard to form auto-coalescible latices. In a specific embodiment it relates to such compositions containing nitrocellulose as the principal film-forming ingredient.

In recent years, lacquer emulsions containing nitrocellulose as the principal film forming constituent have become widely used as coating materials in many applications. Such lacquer emulsions are characterized by ease of application and handling. However, the presence of solvent in these emulsions restricts the solids content attainable therein to an undesirably low level, and presents certain fire and safety hazards as well. These factors have limited the acceptance of lacquer emulsion coatings and accordingly the art has been seeking ways to eliminate the solvent and produce a true latex type coating.

Solvent free latices of nitrocellulose can be prepared in relatively simple manner by distilling off the solvent from a nitrocellulose lacquer emulsion, leaving behind a suspension of fine nitrocellulose-plasticizer particles in water. However, a problem is encountered when one attempts to apply such a latex to a substrate to form a continuous film. The nitrocellulose particles suspended in the latex can be likened to small pieces prepared by breaking up a nitrocellulose film prepared from a dried nitrocellulose lacquer. That is, they are hard, non-tacky, and not disposed to coalesce without the help of some external agency. The plasticizer contained in such particles is intended to act to improve flexibility of the film and does not soften the particles appreciably. (The word "latex" as used in this and succeeding paragraphs is intended to mean an aqueous dispersion, or hydrosol, of suspended fine particles.)

It thus becomes necessary to add to the latex a nitrocellulose coalescing aid or plasticizer of a type which will permit the nitrocellulose particles to coalesce into a film. In one technique which has been suggested for accomplishing this plasticization, a solvent-type plasticizer is included in the lacquer formulation in such amounts that when the particles are formed in the latex, they are properly plasticized for forming a film. This is commonly termed "pre-plasticization." Thus, as soon as the particles are freed from their suspending water, they coalesce to form a film. In such a case, however, the particles are necessarily soft at the coalescing temperature to permit coalescence and since all the particles are similarly soft, a film results which is too soft or tacky. Thus in order to form a film which will be non-tacky and hard at room temperature, it is necessary to use particles which coalesce only at very high temperatures, i.e., high temperature baking is required.

Another approach to film formation from nitrocellulose latices is that of plasticizing the nitrocellulose particles after application of the latex to the substrate. This can be accomplished either by adding the plasticizer to the latex in the form of a separate dispersion or by applying it to the substrate as a second coating following application of the latex. In either case, plasticization takes place by diffusion of the plasticizer into the nitrocellulose particles, softening the same sufficiently to permit coalescence and then further diffusion to permit the film to harden, this is commonly referred to as "post-plasticization." The bulk of the coalescence of the particles must take place while the particles are in contact with the water, since the capillary force of the water evaporating from between the particles and the surface tension of the dispersed particles provide the driving force for the coalescence. Thus, the plasticizer must soften the particles and diffuse into the same sufficiently to permit their coalescence and re-hardening in a relatively short time before or very soon after the water has evaporated completely. Since the nitrocellulose particles are quite hard, presenting a tremendous barrier for the diffusion process, the limited time allowed in most cases is not sufficient to permit formation of a uniformly plasticized film.

Now, according to the instant invention, there is provided a mixed particle nitrocellulose latex containing both "underplasticized" and "overplasticized" particles of nitrocellulose which avoids many of the problems encountered with the pre- and post-plasticization techniques described above.

The underplasticized particles, which can also be referred to as "hard" particles, of the latex of the instant invention are partially plasticized particles which contain insufficient plasticizer to be autocoalescible but which contain sufficient plasticizer to be softened to the extent that they will readily accept further plasticization. The lower limit of plasticization of these particles is that amount which will depress the glass transition temperature, defined as the temperature at which the slope of the volume-temperature curve changes, to the desired film forming temperature while the upper limit is an amount infinitesimally smaller than the desired level of plasticization in the final film. Quantitatively, optimum limits are about 90/10 to about 70/30, preferably 80/20 to 70/30, nitrocellulose/plasticizer weight ratio.

The overplasticized particles, which can also be referred to as "soft" particles, are particles which are plasticized with a solvent type plasticizer to the extent that they will coalesce to form a soft, tacky film at the desired film forming temperature. The optimum nitrocellulose/plasticizer weight ratio of these particles will range from about 1/99 to 55/45, preferably 10/90 to 50/50.

Accordingly, this invention relates to a latex of plasticized nitrocellulose particles dispersed in water, a portion of said particles being underplasticized and containing nitrocellulose plasticizer in an amount to provide a nitrocellulose/plasticizer ratio by weight greater than that of the total dispersion, but sufficient to depress the glass transition temperature of the particles to at least the intended film forming temperature and the remainder of said particles being overplasticized particles containing a nitrocellulose plasticizer in an amount to render the overplasticized particles autocoalescible at the intended film forming temperature, and which latex has an overall nitrocelluose/plasticizer ratio between about 80/20 and 40/60 by weight.

The mixed particle latex of the invention can be prepared by blending, in the desired proportions, dispersions of the hard and soft particles, respectively. These dispersions can be prepared, as set forth above, by emulsifying, in water, lacquers containing the nitrocellulose and the prescribed amount of plasticizer and distilling off the lacquer solvent from the emulsion. The ratio of nitrocellulose to plasticizer is selected within the guidelines set out above to form a hard or soft particle, as the case may be. Thus, the non-volatile, dispersed phase of one dispersion is relatively nitrocellulose rich, containing lower plasticizer content than the final composition and will not coalesce by itself. The other dispersion is plasticizer rich, containing much greater plasticizer content than the desired ultimate composition and will coalesce by itself but will not form a hard, non-tacky film. When the two dispersions are blended in the proper proportions, the overall composition has a nitrocellulose to plasticizer ratio within the range required to form a non-tacky film.

It is also possible, and sometimes desirable, to have more than two types of particles in the composite latex. For example, they can be prepared by blending two or more latices having particles of different nitrocellulose/plasticizer ratios within the hard particle range with a soft particle latex. Alternatively, the hard particle latex can be blended with more than one type of soft particle latex or more than one hard particle can be blended with more than one soft particle.

The compositions of the hard and soft particles to be blended are selected in such a way that the ultimate composition will contain the required ratio of nitrocellulose to plasticizer by blending hard and soft particles at a ratio, by weight, of no more than 9 to 1, more preferably no more than about 4 to 1. This assures that, with homogeneous blending and substantially uniform size of the particles, each hard particle is adjacent to, and hence can come into contact with, at least one soft particle. The ratio at which the particles are mixed determines to some extent the degree of plasticization necessary for each type of particle. Thus, with more highly plasticized soft particles, higher ratio of hard to soft particles can be used. With the preferred degrees of plasticization referred to above for the respective particles, a ratio of hard to soft particles in the range of about 1/1 to 4/1 is optimum for most uses.

As long as the hard and soft particles are suspended in the aqueous dispersing medium a continuous phase between adjacent particles is provided so that little if any intimate physical contact between particles can take place. Since the plasticizers used are usually quite insoluble in water, little or no migration of pasticizer between phases can take place and the distribution of plasticizer between the hard and soft particle phases is maintained.

Upon application of the blended, mixed particle latex to a substrate, accompanied by evaporation of water, the hard and soft particles come into contact with each other. The evaporation of the suspending water creates a capillary force, which acts in conjunction with the surface tension of the particles to cause coalescence. In addition, in the latices of this invention, there is a diffusion potential due to the concentration and viscosity gradients existing between the overplasticized and underplasticized nitrocellulose particles. Furthermore, since the hard particles have already been softened or plasticized to some extent, the diffusion barrier is greatly reduced so that they readily accept the plasticizer from the adjacent soft particles. The plasticizer, driven by the concentration and viscosity gradient between the particles, diffuses from the soft particles, into the hard particles further softening the hard particles, and permitting the hard and soft particles to flow together to an equilibrium condition representing a practically constant nitrocellulose to plasticizer ratio throughout.

The most efficient utilization of plasticizer requires that at least some portion of the nitrocellulose be present in the soft particle phase. That is to say, the soft phase should not be 100% plasticizer. The plasticizer in this phase has the capacity to plasticize a certain amount of nitrocellulose which still possess the desirable characteristics of the soft particles. If no nitrocellulose is included in this phase, this capacity is wasted or unused until the plasticizer comes into contact with a hard particle. When nitrocellulose is included in this phase, the plasticizer will already have performed a part of its function prior to contacting the hard particle, and, so long as the nitrocellulose/plasticizer ratio is not above the maximum specified, it will still be able to function well in plasticizing the hard particles. The result is that there is some nitrocellulose giving up plasticizer and other nitrocellulose receiving the same with the whole mass moving in the direction of equilibrium. The total amount of plasticization to be accomplished during coalescence is thus less than would be required if there were no nitrocellulose in the plasticizer phase and the total can more readily be accomplished within a relatively short time. The inclusion of nitrocellulose in the soft phase also results in a greater distribution of nitrocellulose over the surface of the substrate and lessens the amount of migration or diffusion which the nitrocellulose must undergo in order to form a continuous film.

So far as the quality if the final film is concerned, the overall nitrocellulose/plasticizer weight ratio is the most important parameter to be considered in preparing the mixed particle latices of this invention. Preparation of coalesced hard films requires that this ratio be between about 80/20 and 40/60. If higher ratios are used, coalescence will not result except upon relatively rigorous baking and the resulting film will be brittle and unsatisfactory. If the ratio is lower than about 40/60, the coalesced film will be too tacky, even at room temperature, to be useful. Within the specified range, non-tacky films can be prepared, sometimes at room temperature or with relatively mild baking. The latex compositions of the invention, in most cases, are capable of forming films at room temperature. Thus, they can be used for virtually any coating operation. In some cases, notably when the soft particles are formulated with the higher nitrocellulose to plasticizer ratios or when the hard to soft particle ratio is on the high side, mild baking is desirable. In all cases, the coalescence can be accelerated by addition of small amounts of heat, if time limitations so require.

Nitrocellulose plasticizers are commonly classified as primary (solvents) or secondary plasticizers (softeners). The solvent type plasticizers, which are employed in this invention, are well known materials, being non-volatile substances which boil at higher than about 250° C., and which are able to convert the nitrocellulose to a gel or even a solution if used in sufficient quantity.

In order for the latices to exhibit the required coalescibility, it is necessary that sufficient quantity of solvent type or primary plasticizer be used. Different plasticizers, of course, exhibit different degrees of solvency for nitrocellulose, and not all are equivalent in their performance. The degree of solvency of the plasticizer determines the nitrocellulose to plasticizer ratio in the final film and the overall composition of the film. Generally speaking, however, it is desirable to use plasticizers which have a relatively high degree of solvency for nitrocellulose.

The solvent-type plasticizers can be further classified as water-soluble or water-insoluble. The plasticizers useful in this invention must be insoluble or substantially insoluble in water in order to assure that the plasticizer remains in the suspended phase of the latex.

Examples of water-insoluble, solvent-type plasticizers having a high degree of solvency for nitrocellulose which are useful in this invention include triethylene glycol di- 2-ethyl butyrate, tributoxyethyl phosphate, triethyl citrate, acetyl triethyl citrate, diisobutyl adipate, dibutyl itaconate, and dibutyl sebacate. Others of lesser solvency which are useful in some instances include diethyl tartrate, tetraethylene glycol di-2-ethyl caproate, dibutyl tartrate, di (benzoyl triethylene glycol) phthalate, dibutyl phthalate, di-2-ethylhexyl adipate, dioctyl adipate, dioctyl azelate, di-2-ethylhexyl azelate, dioctyl sebacate, dioctyl phthalate, lower alkyl phosphates, aryl phosphates, alkyl aryl phosphates, butyl phthalylbutyl glycolate, chlorinated biphenyl, butyl benzyl phthalate, acetyl tributyl citrate, and chloroalkyl phosphates.

It is also possible and frequently desirable to employ different water-insoluble, solvent-type plasticizers. Thus, for example, the soft particle latex can contain a high solvency plasticizer while the hard particle contains one of lower solvency or vice versa. Normally, if more than one plasticizer is used, say for reasons of economics, it is desirable to have the lower solvency plasticizer in the hard particle phase. Since the mechanism for coalescence is the diffusion of the soft particles into the hard particles, it follows that it is desirable to have the soft particles as fluid or mobile as possible. It is also feasible to have more than one plasticizer in one or both phases.

In other respects, the formulations of the mixed particle latices of the instant invention follow closely the formulations heretofore known for both solvent and emulsion lacquers. In particular, it is often desirable, but not in all cases necessary, to include in these formulations a modifying resin of the type commonly used in nitrocellulose lacquer which increases the hardness, stain resistance or other properties of the lacquer film. In some cases these resins contribute some plasticizing effect of their own to the nitrocellulose. These resins are usually compounds soluble in the active nitrocellulose solvent. When emulsion lacquers are employed, the resin, of course, remains dissolved in the oil phase. In the latices of the instant invention, the resin, the plasticizer and the nitrocellulose are intimately blended in each particle suspended in the carrier liquid after the removal of the nitrocellulose solvent. When the latex particles are coalesced into a film, the resin is uniformly mixed with the other components as part of the same film. Typical resins that can be used are the maleic modified rosin esters, ester gums, dammar gum, shellac, alkyd resins, chlorinated triphenyls, acrylic resins, vinyl resins or any other natural or synthetic resins compatible with nitrocellulose. As in standard nitrocellulose lacquer formulation the weight ratio of nitrocellulose to resin is desirably between about 33/67 and 67/33.

To assure the maintenance of the nitrocellulose particles and other solids in the dispersed state, an emulsifying agent or a protective colloid can be included in the equeous phase of the dispersion. Any agent normally useful in this capacity with lacquer emulsions can be employed. Typical of such materials are alkyl phenyl ethers of ethylene oxide condensates, alkyl phenyl sulfonates, sodium or potassium oleates and water-soluble cellulosic derivatives such as methyl cellulose, inter alia.

Other additives can be added, as needed, to provide other specific properties. For example, it is sometimes desirable to add a small amount of a water-soluble material to retard the rate of evaporation of the water. This has the effect of imparting greater stability to the latex prior to use. It also helps in the coalescence of the nitrocellulose particles by maintaining a fluid environment for a longer period during which coalescence can take place. Glycols in general are very useful in this respect. In particular, ethylene glycol, at a level of about 4% of the weight of the water in latex, is a very useful evaporation retardant. It is preferable to use a retardant which will evaporate, even though slowly, from the film.

It is also possible to add pigments and other fillers to these latices. In particular, these latices produce such glossy coatings that it is sometimes desirable to add a flatting agent to reduce the gloss. Any flatting agent normally employed in nitrocellulose lacquers can be employed for this purpose.

One significant advantage of the nitrocellulose latices of this invention over nitrocellulose coating compositions—i.e. the clear lacquers and lacquer emulsions—known to the prior art is that they can be prepared and applied with a much higher solids content than can the prior art compositions. In the prior art compositions, the limiting factor in the determination of total solids of the composition is the viscosity of the lacquer solution. Normally, the maximum solids content permissible with such lacquers is about 30%. At higher solids contents, the viscosity becomes so great as to create severe problems in applying the lacquers. With the latex coating compositions of this invention, the upper limit of solids content is not determined by viscosity, since there is no solution of the solid components. In this case, maximum solids content is determined by the quality of the coalesced film. Useable films can be prepared with latices having total solids content as high as 65%. It is usually not economically feasible to prepare these latices with less than about 40% solids. The range of 45 to 55% total solids is preferred.

The solid components of the film, other than nitrocellulose and plasticizer, i.e. the resins, pigments, etc., can be included in either the hard or the soft particle nitrocellulose phase or in separate phases, in some instances.

Since the hard particle phase is usually the larger phase, the additives are most conveniently added to this phase.

Nitrocellulose latices prepared according to the process of the invention can be used in any of the applications in which nitrocellulose lacquers and lacquer emulsions are usually employed. Large volumes of such lacquers are used in applying moisture-proof coatings to paper and other materials such as cloth and leather, inter alia. They are also used in preparing heat-sealable coatings for paper. Another large volume use for such coating materials is in wood finishing as, for example, in wall paneling and fine furniture where the depth of film build-up, hardness, durability and moisture resistance of the resultant film make them especially valuable.

The invention, having been described in some detail, will now be exemplified. In the descriptions which follow, parts and percentages are by weight if not otherwise specified.

EXAMPLE 1

A nitrocellulose soft particle latex was prepared by dissolving 40 parts fibrous nitrocellulose (15.20 sec. viscosity 11% N) in ethyl acetate along with 60 parts of tributoxy ethyl phosphate plasticizer. This solution was added, with vigorous agitation to 100 parts of water containing 5% of an alkylphenyl ether of an ethylene oxide condensate as an emulsifying agent. Agitation was continued until a smooth, stable homogeneous, emulsion was formed. The solvent was stripped from this emulsion by raising the temperature to about 60° C. while continuing the agitation. Removal of the solvent left a very fluid, smooth flowing nitrocellulose dispersion containing about 50% solids.

Following the same procedure a hard particle latex was prepared, containing 40 parts of the same nitrocellulose, 10 parts of tributoxy ethyl phosphate and 50 parts of a maleic modified rosin ester.

The hard and soft particle dispersions prepared as above were combined in the ratio of 100 parts of the hard particle dispersion to 30 parts of the soft particle dispersion. After thorough blending, a milky white, very fluid latex was recovered.

The mixed particle latex was roller coated onto a plywood panel and allowed to dry at normal room temperature. Drying was complete after about one-half hour. The particles had coalesced to form a clear, hard, non-tacky film. The panel was sanded well with a fine sandpaper and a second coat of the latex applied and allowed to dry. The resultant coating was non-tacky, clear, and possessed a high gloss.

EXAMPLE 2

Following the procedure set forth in Example 1, a hard particle latex dispersion was prepared having nitrocellulose/tributoxy ethyl phosphate/resin ratio of 52/13.5/34.5. This material was blended with the 40/60/0 soft particle prepared in Example 1 in a ratio of 78 parts of the hard particle latex to 30 parts of the soft particles.

The resultant composition formed a clear, hard film on a plywood panel after drying at normal room temperature for about one-half hour. The panel was sanded with fine sandpaper and second coated. A bright, glossy, hard film resulted.

EXAMPLES 3–5

The latices prepared in Examples 1 and 2 were blended to yield latices having soft particles and particles of varying degrees of hardness. The blends prepared and their overall proportional composition are tabulated below. In the table, component A is the latex of Example 1, component B is that from Example 2 and the overall composition is expressed as the nitrocellulose/resin/plasticizer ratio.

| Ex. No. | Components | | Overall composition |
|---|---|---|---|
| | A | B | |
| 3 | 2 | 1 | 42.9/33.9/23.2 |
| 4 | 1 | 1 | 44.4/31.6/24.0 |
| 5 | 1 | 2 | 45.8/29.4/24.8 |

In each case a clear, non-tacky film was formed by applying the latex to a plywood substrate and drying at room temperature.

EXAMPLES 6–11

Latices were prepared as above, containing about 50% solids, wherein portions of the tributoxy ethyl phosphate were replaced with dibutyl phthalate, a nitrocellulose plasticizer of lesser solubility for nitrocellulose. The following particles were prepared:

| Comp. | Type Particle | Nitrocellulose | Resin | TBEP [1] | DBP [2] |
|---|---|---|---|---|---|
| A | Soft | 40 | 0 | 60 | 0 |
| B | do | 40 | 0 | 34.5 | 25.5 |
| C | do | 40 | 0 | 0 | 60 |
| D | Hard | 46 | 42.5 | 11.5 | 0 |
| E | do | 46 | 42.5 | 0 | 11.5 |

[1] Tributoxy ethyl phosphate.
[2] Dibutyl phthalate.

These latices were blended at various ratios to yield mixed particle compositions of constant overall nitrocellulose/resin/plasticizer ratio, but with varying locations of the two plasticizers and varying ratios between the two. The following compositions were prepared:

| Ex. No. | Hard part. | Soft part. | Composition* | Location of plast. | | Coalescibility |
|---|---|---|---|---|---|---|
| | | | | TBEP | DDP | |
| 6 | D | A | 44.5/31.9/23.6/0 | S | | E |
| 7 | D | B | 44.5/31.9/15.0/8.6 | H&S | S | G |
| 8 | D | C | 44.5/31.9/8.6/15.0 | H | S | F |
| 9 | E | A | 44.5/31.9/15.0/8.6 | S | H | G |
| 10 | E | B | 44.5/31.9/6.4/17.2 | S | H&S | F |
| 11 | E | C | 44.5/31.9/0/23.6 | | H&S | P |

*Nitrocellulose/resin/TBEP/DBP.
Coalescibility was rated as excellent to poor as follows: Excellent (E)—Very clear, transparent film; Good (G)—Almost clear, transparent film, very slight, either white or bluish haze; Fair (F)—Moderately hazy film, not completely transparent, some cracking and discontinuity in film; Poor (P)—Extensively cracked, large discontinuous, uncoalesced areas.

As the data in Examples 6 to 11 show, best results are obtained when (a) the bulk of the plasticizer is the high solvency type and (b) the soft particles are plasticized principally by the high solvency plasticizer. When only the low solvency plasticizer was used, coalescence did not occur as the nitrocellulose/plasticizer ratio was too high for this type of plasticizer.

EXAMPLE 12

Hard and soft particle latices corresponding to those prepared in Examples 1 and 2 were prepared containing diisobutyl adipate as plasticizer. Their performance was equivalent to that of the latices containing tributoxyethyl phosphate.

EXAMPLE 13

Latices corresponding to those of Examples 1 and 2 were prepared wherein a cocoanut oil alkyd resin was employed as the resin in place of the maleic modified rosin ester. Performance was equivalent.

EXAMPLE 14

A hard particle latex was prepared containing a 70/30 ratio of nitrocellulose to diisobutyl adipate, with no modifying resin. Twenty (20) parts of this was blended with 5 parts each of 2 soft particles having respectively 55/45 and 40/60 nitrocellulose to diisobutyl adipate ratio. Two coats of this composition were applied to a clay coated, super calendered paper stock using a No. 8 Myer rod.

The coatings coalesced at room temperature within about 16 minutes to yield a clear, glossy crack free coating. When bonded by heat sealing at 300° F., 60 p.s.i. pressure, and ½ second dwell time, this coating exhibiting very good peel strength.

The mixed particle latices of this invention can be prepared from any of the commercial types and grades of nitrocellulose, having nitrogen contents from about 10.9 to 13.5% by weight, and of any viscosity characteristic from the very low viscosity 10 centipoise type to those of exceedingly high viscosity as exemplified by dynamite grade nitrocellulose.

While the invention has been described in terms of nitrocellulose and materials compatible therewith, it should be understood that the technique of forming a coalescible latex by the hard and soft particle approach described above is not limited in its efficacy to use with nitrocellulose. It can also be used with other known film formers, e.g. chlorinated rubber, vinyl acetate, vinyl chloride, vinylidene chloride copolymers, and the like.

What I claim and desire to protect by Letters Patent is:

1. A latex of plasticized nitrocellulose particles dispersed in water, a portion of said particles being underplasticized particles containing a water-insoluble, solvent-type nitrocellulose plasticizer having a boiling point of at least about 250° C., in an amount to provide a nitrocellulose/plasticizer ratio between about 90/10 and 70/30 by weight, the remainder of said particles being overplasticized particles, autocoalescible at normal room temperature, containing a water-insoluble, solvent-type nitrocellulose plasticizer having a boiling point of at least 250° C. in an amount to provide a nitrocellulose/plasticizer ratio between about 1/99 and 55/45 by weight, said latex having an overall nitrocellulose to plasticizer ratio between about 80/20 and 40/60 by weight, the ratio of underplasticized particles to overplasticized particles being between about 1/1 and 9/1 by weight, and the total solids content of the latex being between about 40 and 65% by weight.

2. The latex of claim 1 where the nitrocellulose plasticizer is selected from the class consisting of tributoxyethyl phosphate, diisobutyl adipate, triethylene glycol di-2-ethyl butyrate, triethyl citrate, dibutyl sebacate, dibutyl itaconate, dibutyl phthalate, diethyl tartrate, tetraethylene glycol di-2-ethyl caproate, dibutyl tartrate, dioctyl phthalate, dioctyl adipate, di-2-ethylhexyl azelate, di-2-ethylhexyl adipate, dioctyl azelate.

3. The latex of claim 2 including a nitrocellulose modifying resin, the ratio of nitrocellulose to said resin being within the range of about 33/67 to 67/33.

4. The latex of claim 2 including, as a nitrocellulose modifying resin, maleic anhydride modified rosin ester.

5. A latex of plasticized nitrocellulose particles dispersed in water containing a hard particle phase comprising nitrocellulose particles having a ratio of nitrocellulose to plasticizer within the range between about 90/10 and 70/30 by weight, and a soft particle phase comprising nitrocellulose particles have a nitrocellulose to plasticizer ratio in the range between about 10/90 and 50/50, the plasticizer in each of said particle phases being a substantially water-insoluble, solvent-type nitrocellulose plasticizer having a boiling point of at least about 250° C., said hard and soft particles being present in the ratio of about 1/1 to 4/1, the total solids content of the latex being between about 50 and 55% by weight, and the overall nitrocellulose to plasticizer ratio being about 70/30 to 60/40.

6. The latex of claim 5 including a nitrocellulose modifying resin, the ratio of said nitrocellulose to said resin being between about 33/67 and 67/33.

7. The latex of claim 6 including as a nitrocellulose modifying resin maleic anhydride modified rosin ester.

8. The latex of claim 7 where the nitrocellulose plasticizer is tributoxyethyl phosphate.

9. The latex of claim 7 where the nitrocellulose plasticizer is diisobutyl adipate.

10. The latex of claim 7 where the nitrocellulose plasticizer in the soft particle phase is tributoxyethyl phosphate and the nitrocellulose plasticizer in the hard particle is dibutyl phthalate.

11. The latex of claim 7 having dissolved in the water phase thereof about 4% based on the weight of the water of ethylene glycol.

12. The latex of claim 7 where the modifying resin is incorporated into the hard particle phase.

13. The latex of claim 6 where the modifying resin is a vinyl resin compatible with nitrocellulose.

14. The latex of claim 6 where the modifying resin is an acrylic resin compatible with nitrocellulose.

15. The latex of claim 6 where the modifying resin is an alkyd resin compatible with nitrocellulose.

References Cited
UNITED STATES PATENTS

| | | | |
|---|---|---|---|
| 2,500,122 | 3/1950 | Dixon et al. | 106—170 |
| 2,658,002 | 11/1953 | Schwefsky | 106—170 |
| 2,792,314 | 5/1957 | Brown | 106—170 |
| 2,843,582 | 7/1958 | Voris | 106—170 |
| 3,198,645 | 8/1965 | Plunguian | 106—170 |

ALLAN LIEBERMAN, *Primary Examiner.*

U.S. Cl. X.R.

106—173, 177 178; 260—16, 17